United States Patent
Kamoshida et al.

(10) Patent No.: US 10,995,197 B2
(45) Date of Patent: May 4, 2021

(54) POLYAMIDE RESIN COMPOSITION AND MOLDED ARTICLE THEREOF

(71) Applicant: KURARAY CO., LTD., Kurashiki (JP)

(72) Inventors: Kensuke Kamoshida, Tsukuba (JP); Hideaki Takeda, Tsukuba (JP); Go Tazaki

(73) Assignee: KURARAY CO., LTD., Kurashiki (JP)

( * ) Notice: Subject to any disclaimer, the term of this patent is extended or adjusted under 35 U.S.C. 154(b) by 0 days.

(21) Appl. No.: 15/535,341

(22) PCT Filed: Dec. 16, 2015

(86) PCT No.: PCT/JP2015/085227
§ 371 (c)(1),
(2) Date: Jun. 12, 2017

(87) PCT Pub. No.: WO2016/098812
PCT Pub. Date: Jun. 23, 2016

(65) Prior Publication Data
US 2018/0009965 A1  Jan. 11, 2018

(30) Foreign Application Priority Data

Dec. 16, 2014 (JP) .............................. JP2014-254049

(51) Int. Cl.
| | | |
|---|---|---|
| *C08G 69/26* | (2006.01) |
| *C08L 77/06* | (2006.01) |
| *C08K 5/053* | (2006.01) |
| *C08K 5/06* | (2006.01) |
| *C08K 7/14* | (2006.01) |

(52) U.S. Cl.
CPC ............ *C08K 5/06* (2013.01); *C08G 69/26* (2013.01); *C08G 69/265* (2013.01); *C08K 7/14* (2013.01); *C08L 77/06* (2013.01)

(58) Field of Classification Search
None
See application file for complete search history.

(56) References Cited

U.S. PATENT DOCUMENTS

| | | | | |
|---|---|---|---|---|
| 2005/0136237 A1* | 6/2005 | Beerda | ............... | C03C 25/26 428/297.4 |
| 2009/0305016 A1* | 12/2009 | Miyoshi | ............... | C08L 71/12 428/220 |
| 2010/0028580 A1 | 2/2010 | Palmer et al. | | |
| 2010/0120958 A1 | 5/2010 | Qin et al. | | |
| 2017/0022349 A1* | 1/2017 | Mii | ............... | C08K 5/053 |

FOREIGN PATENT DOCUMENTS

| | | | |
|---|---|---|---|
| CN | 102093706 A | 6/2011 | |
| EP | 3 133 123 A1 | 2/2017 | |
| JP | 56-161426 A | 12/1981 | |
| JP | 2008-274305 A | 11/2008 | |
| JP | 2011-529987 A | 12/2011 | |
| JP | 2011-529991 A | 12/2011 | |
| JP | 2014-15589 | 1/2014 | |
| JP | 2014-218574 A | 11/2014 | |
| WO | 2011/111713 A1 | 9/2011 | |
| WO | WO-2015159834 A1 * | 10/2015 | ............ C08K 5/053 |

OTHER PUBLICATIONS

Mason, K. "Sizing Up Fiber Sizings". Composites World. 2006. Retrieved from compositesworld.com on Jan. 21, 2020. (Year: 2006).*
International Search Report dated Mar. 15, 2016 in PCT/JP2015/085227 filed Dec. 16, 2015.
Extended European Search Report dated Jul. 13, 2018 in European Patent Application No. 15870014.6, 8 pages.

* cited by examiner

*Primary Examiner* — Richard A Huhn
(74) *Attorney, Agent, or Firm* — Oblon, McClelland, Maier & Neustadt, L.L.P.

(57) ABSTRACT

Provided are a polyamide resin composition prepared by blending a polyamide resin (A) and a polyalcohol (B), wherein the proportion of the number of the amide groups to the number of the carbon atoms in the polyamide resin (A) is 0.080 to 0.140 and the blending amount of the polyalcohol (B) is 1 to 10 parts by mass relative to 100 parts by mass of the polyamide resin (A); and a molded article of the resin composition.

9 Claims, No Drawings

POLYAMIDE RESIN COMPOSITION AND MOLDED ARTICLE THEREOF

TECHNICAL FIELD

The present invention relates to a polyamide resin composition and a molded article thereof. Precisely the present invention relates to a polyamide resin composition having excellent long-term heat resistance and long-term acid resistance, and to a molded article such as automobile parts and the like produced by using the polyamide resin composition.

BACKGROUND ART

A polyamide-based resin composition has excellent heat resistance, chemical resistance and moldability, and is used as a material for automobile parts.

Recently, for satisfying the requirement for improvement of fuel efficiency and for global exhaust gas regulation, popularization of automobiles equipped with a supercharger and an exhaust gas recirculation (EGR) system has become required. The area around the engine of an automobile equipped with a supercharger and EGR is exposed to a high-temperature environment at higher than 200° C. for a long period of time, and in addition, sulfur oxides (SOx) and nitrogen oxides (NOx) in an exhaust gas dissolve in water vapor therearound to form an aqueous, strong acid solution having pH of 1 or lower, and therefore the area is often exposed to a strong acid environment for a long period of time. When a polyamide resin is exposed to the above-mentioned high-temperature environment, there occurs a problem of degradation thereof owing to oxidation. In addition, in the above-mentioned strong acid environment, a polyamide resin may deteriorate owing to hydrolysis starting from the amide group thereof and, as a result, the strength of the polyamide resin and that of a composition containing the polyamide resin may lower. Accordingly, for use in the area around the engine of an automobile equipped with a supercharger and an EGR, a polyamide resin composition having more excellent long-term heat resistance and long-term acid resistance than before is desired.

As a trial of improving long-term heat resistance endurable in the above-mentioned high-temperature environment, there is known an example of adding a polyalcohol to a polyamide resin composition. PTL 1 discloses a resin composition containing a thermoplastic resin selected from a group consisting of a polyamide, a polyester and a mixture thereof, and one or plural kinds of polyalcohols having more than two hydroxyl groups and having number-average molecular weight of less than 2,000. Regarding the disclosed resin composition, however, the long-term heat resistance thereof at 230° C. be improved but there still remains room for improvement of acid resistance of the composition.

On the other hand, as a trial of improving acid resistance endurable in the above-mentioned strong-acid environment, there known an example of selecting the resin or the reinforcing agent to constitute a polyamide resin composition. PTL 2 discloses a polyamide resin composition excellent in acid resistance, wherein a polyoxamide resin is used as the polyamide resin in the polyamide resin composition or glass fibers not containing boron oxide are used as the reinforcing agent to constitute the polyamide resin composition. Regarding the disclosed resin composition, however, the long-term acid resistance thereof in an aqueous sulfuric acid solution could be improved but there still remains room for improvement of heat resistance of the composition.

CITATION LIST

Patent Literature

PTL 1: JP-T 2011-529991
PTL 2: WO2011/111713

SUMMARY OF INVENTION

Technical Problem

As described above, according to already-existing techniques, it is impossible to provide a polyamide resin composition satisfying both high-level long-term heat resistance and long-term acid resistance required tor engine peripheral parts of automobiles equipped with a supercharger and EGR as mentioned above. In particular, in such use, it is important that the composition does not almost undergo reduction in mechanical strength even though exposed to a strong-acid environment for a long period of time after having been exposed to a high-temperature environment for a long period of time.

In view of the above-mentioned points, the present invention is addressed to providing a polyamide resin composition satisfying both long-term heat resistance and long-term acid resistance and a molded article thereof.

Solution to Problem

The present inventors have assiduously studied and, as a result, have found that a polyamide resin composition prepared by blending a specific polyamide resin and a specific compound can solve the above-mentioned problems.

Specifically, the present invention provides:

(1) A polyamide resin composition prepared by blending a polyamide resin (A) and a polyalcool (B), wherein the proportion of the number of the amide groups to the number of the carbon atoms in the polyamide resin (A) is 0.080 to 0.140 and the blending amount of the polyalcohol (B) is 1 to 10 parts by mass relative to 100 parts by mass of the polyamide resin (A).

(2) The polyamide resin composition according to the above (1), further blended a filler (C).

(3) The polyamide resin composition according to the above (1) or (2), wherein the polyamide resin (A) has a structural unit derived from a diamine component (i) having 9 to 12 carbon atoms and a structural unit derived from a dicarboxylic acid component (ii) selected from terephthalic acid and 1,4-cyclohexanedicarboxylic acid.

(4) The polyamide resin composition according to the above (3), wherein the diamine component (i) is a diamine having 9 carbon atoms.

(5) The polyamide resin composition according to any of the above (1) to (4), wherein the polyalcohol (B) is dipentaerythritol.

(6) A molded article obtained by molding the polyamide resin composition of any of the above (1) to (5).

(7) The molded article according to the above (6), wherein the molded article is automobile parts.

Advantageous Effects of Invention

The polyamide resin composition of the present invention is excellent in long-term heat resistance and long-term acid resistance, and can be widely used in production of various molded articles such as engine peripheral parts of automobiles equipped with a supercharger and EGR, as well as other automobile parts than engine peripheral parts, electric components, electronic components, industrial components, etc.

DESCRIPTION OF EMBODIMENTS

<Polyamide Resin Compositions>

The polyamide resin composition of the present invention is prepared by blending a polyamide resin (A) and a polyalcohol (B), wherein the proportion of the number of the amide groups to the number of the carbon atoms in the polyamide resin (A) is 0.080 to 0.140 and the blending amount of the polyalcohol (B) is 1 to 10 parts by mass relative to 100 parts by mass of the polyamide resin (A). The present invention is described in detail hereinunder.

[Polyamide Resin (A)]

In the polyamide resin (A), the proportion of the number of the amide groups (hereinafter referred to as "amide group concentration") to the number of the carbon atoms in the polyamide resin (A) is 0.080 to 0.140, from the viewpoint of improving the long-term acid resistance of the polyamide resin composition. The amide group concentration is specifically a value obtained from {[the number of the amide groups in the polyamide resin (A)]/[the number of the carbon atoms in the polyamide resin (A)}.

When the amide group concentration in the polyamide resin (A) is more than 0.140, the proportion of the content of the amide groups that are the originations of hydrolysis increases and therefore the resistance of the resin to chemicals including aqueous strong-acid solutions and water lowers, and the long-term acid-resistance thereof lowers. On the other hand, when the amide group concentration is less than 0.080, the stiffness of the polyamide resin composition lowers therefore often detracting from mechanical strength and thermal characteristics thereof.

From the viewpoint of further more exhibiting the above-mentioned effects, the range of the amide group concentration in the polyamide resin (A) is preferably 0.100 to 0.130.

The polyamide resin (A) is not specifically limited so far as the amide group concentration therein is within a range of 0.080 to 0.140, and examples thereof include poly(hexamethylenediamide) (PA610), poly(hexamethylenedodecanediamide) (PA612), poly(decamethylenedecanediamide) (PA 1010), poly(nonamethylenediamineterephthalamide) (PA9T), poly(nonamethylenecyclohexanedicarboxyamide) (PA9C), poly(decamethyleneterephthalamide) (PA10T) poly(undecanemethyleneterephthalamide) (PA11T), poly(dodecanemethyleneterephthalamide) (PA12T). One alone or two or more of these polyamide resins may be used either singly or as combined.

In the case where two or more kinds of polyamide resins are used as combined, the amide group concentration in the polyamide resin (A) is a value to be calculated from the amide group concentration in each polyamide resin and the content ratio of the resins, and the value is good to fall within a range of 0.080 to 0.140.

Above all, from the viewpoint of improving the long-term acid resistance and, in addition, also improving the long-term heat resistance, the stiffness and the mechanical strength thereof, the polyamide resin (A) preferably has a structural unit derived from a diamine component (i) having 9 to 12 carbon atoms and a structural unit derived from a dicarboxylic acid component (ii) selected from terephthalic acid and 1,4-cyclohexanedicarboxylic acid. From the viewpoint of imparting excellent long-term acid resistance, the carbon number of the diamine component (i) is more preferably 9. By combining the polyamide resin and the polyalcohol (B) to be mentioned hereinunder, there can be realized a polyamide resin composition and a molded article that do not almost undergo reduction in mechanical strength even though exposed to a strong-acid environment for a long period of time after having been exposed to a high-temperature environment for a long period of time like engine peripheral parts of automobiles equipped with a supercharger and EGR.

Preferably, the diamine component (i) having 9 to 12 carbon atoms is an aliphatic diamine, and examples thereof include 1,9-nonamethylenediamine, 2-methyl-1,8-octamethylenediamine, 1,10-decamethylenediamine, 1,11-undecamethylenediamine, 1,12-dodecamethylenediamine. One alone or two or more of these diamine components may be used either singly or as combined. Further, among these, diamine components having 9 carbon atoms as selected from 1,9-nonamethylenediamine, 2-methyl-1,8-octamethylenediamine and a mixture thereof are more preferred.

In the case where a mixture of 1,9-nonamethylenediamine and 2-methyl-1,8-octamethylenediamine is used as the diamine component (i), the mixing ratio of the two is preferably 1,9-nonamethylenediamine/2-methyl-1,8-octamethylenediamine=99/1 to 1/99 (molar ratio), more preferably 95/5 to 50/50, even more preferably 90/10 to 75/25. A polyamide resin composition prepared by blending the polyamide resin (A) that contains structural units derived from 1,9-nonamethylenediamine and 2-methyl-1,8-octamethylenediamine in the ratio as above is especially excellent in resistance to hydrolysis with an aqueous strong-acid solution and can therefore has especially high-level long-term acid resistance.

From the viewpoint of improving long-term heat resistance, long-term acid resistance, stiffness and mechanical strength, the content of the structural unit derived from the diamine component (i) in the polyamide resin (A) is preferably 80 to 100 mol % relative to the entire structural unit derived from the diamine component, more preferably 90 to 100 mol %. The content of the structural unit derived from the tricarboxylic acid component (ii) in the polyamide resin (A) is preferably 80 to 100 mol % relative to the entire structural unit derived from the dicarboxylic acid component, more preferably 90 to 100 mol %.

The molar ratio of the structural unit derived from the diamine component to the structural unit derived from the dicarboxylic acid component [diamine component-derived structural unit/dicarboxylic acid component-derived structural unit] is, from the viewpoint of expressing long-term heat resistance and long-term acid resistance, preferably within a range of 0.80 to 1.25, more preferably 0.90 to 1.10, even more preferably 0.95 to 1.05.

Preferably the polyamide resin (A) is formed only of the structural unit derived from a diamine component and the structural unit derived from a dicarboxylic acid component, but within a range not detracting from the advantageous effects of the present invention, the polyamide resin (A) may contain any other structural unit derived from an aminocarboxylic acid, a lactam or the like. The content thereof is preferably 10 mol % or less relative to the entire structural unit in the polyamide resin (A).

The limiting viscosity (ηinh) of the polyamide resin (A), as measured in the form of a solution in concentrated sulfuric acid having a sample concentration of 0.2 g/dL at a temperature of 30° C., preferably within a range of 0.4 to 3.0 dL/g, more preferably within a range of 0.5 to 2.0 dL/g, even more preferably within a range of 0.6 to 1.8 dL/g. When ηinh of the polyamide resin (A) falls within the range, the polyamide resin composition to be obtained may have more excellent mechanical strength and thermal properties. When the viscosity of the polyamide resin (A) is too high, the polyalcohol (B) would poorly disperse in the polyamide resin composition and the resultant polyamide resin composition and a molded article thereof could not be given sufficient long-term heat resistance and long-term acid resistance and, further, the surface of the molded article may often whiten; however, when ηinh of the polyamide resin (A) falls within the above-mentioned range, such disadvantages can be evaded.

The blending amount of the polyamide resin (A) in the polyamide resin composition is, from the viewpoint of expressing the long-term heat resistance and the long-term acid resistance owing to the reaction with the polyalcohol (B) to be mentioned below, preferably 40% by mass or more, more preferably 45% by mass or more, and is preferably 99% by mass or less.

(Production Method for Polyamide Resin (A))

The production method for the polyamide resin (A) is not specifically limited, and any known method is employable. For example, in the case where the polyamide resin (A) is produced starting from a dicarboxylic acid component and a diamine component, the resin can be produced according to a method of a melt polymerization method, a solid-phase polymerization method, a melt extrusion polymerization method, etc.

One example of a preferred polymerization condition in the case of producing the polyamide resin (A) starting from a dicarboxylic acid component and a diamine component is the following condition.

First, a dicarboxylic acid component and a diamine component to constitute the polyamide resin (A), and a catalyst and a terminal capping agent that may be used optionally are mixed all at a time to prepare a nylon salt, and then heated at a temperature of 200 to 260° C. to give a solution that contains a prepolymer having a water content of preferably 10 to 40%. The solution is further sprayed into an atmosphere at 100 to 150° C. to give a powdery prepolymer having ηinh, as measured in the form of a solution in concentrated sulfuric acid having a sample concentration of 0.2 g/dL at a temperature of 30° C., of preferably 0.1 to 0.6 dL/g. With that, this is further polymerized in a mode of solid-phase polymerization or using a melt extruder to give the polyamide resin (A) having ηinh, as measured in the form of a solution in concentrated sulfuric acid having a sample concentration of 0.2 g/dL at a temperature of 30° C., of preferably 0.4 to 3.0 dL/g.

When ηinh of the prepolymer is within a range of 0.1 to 0.6 dL/g, molar misbalance between the carboxyl group and the amino group in the later step of polymerization could be small and the polymerization rate may lower little, and therefore the polyamide resin (A) having excellent physical properties can be obtained.

Examples of the catalyst include phosphoric acid, phosphorous acid, hypophosphorous acid, and salts and esters thereof, specifically including salts of phosphoric acid, phosphorous acid or hypophosphorous acid with a metal such as potassium, sodium, magnesium, vanadium, calcium, zinc, cobalt, manganese, tin, tungsten, germanium, titanium, antimony, etc.; ammonium salts of phosphoric acid, phosphorous acid or hypophosphorous acid; ethyl esters, isopropyl esters, butyl esters, hexyl esters, isodecyl esters, octadecyl esters, decyl esters, stearyl esters or phenyl esters of phosphoric acid, phosphorous acid or hypophosphorous acid, etc.

The terminal capping agent is not specifically limited so far as it is a monofunctional compound reactive with the amino group or the carboxyl group at the terminal of polyamide. From the viewpoint of reactivity and the stability in terminal capping, a monocarboxylic acid or a monoamine is preferred, and from the viewpoint of easy handleability a monocarboxylic acid is more preferred. In addition, monoisocyanates, monoacid halides, monoesters, monoalcohols and others are usable as the terminal capping agent.

The monocarboxylic acid usable as the terminal capping agent is not specifically limited so far as it has reactivity with an amino group, and examples thereof include aliphatic monocarboxylic acids such as acetic acid, propionic acid, butyric acid, valeric acid, caproic acid, caprylic acid, lauric acid, tridecanoic acid, myristic acid, palmitic acid, stearic acid, pivalic acid, isobutyric acid, etc.; alicyclic monocarboxylic acids such as cyclohexanecarboxylic acid, etc.; aromatic monocarboxylic acids such as benzoic acid, toluic acid, α-naphthalenecarboxylic acid, β-naphthalenecarboxylic acid, methynapthalenecarboxylic acid, phenylacetic acid, etc.; arbitrary mixture of these, etc. Among these, from the viewpoint of reactivity, stability of capped terminal, cost, etc., acetic acid, propionic acid, butyric acid, valeric acid, caproic acid, caprylic acid, lauric acid, tridecanoic acid, myristic acid, palmitic acid, stearic acid and benzoic acid are preferred.

The monoamine usable as the terminal capping agent is not specifically limited so far as it has reactivity with a carboxyl group, and examples thereof include aliphatic monoamines such as methylamine, ethylamine, propylamine, butylamine, hexylamine, octylamine, decylamine, stearylamine, dimethylamine, diethylamide, dipropylamine, dibutylamine, etc.; alicyclic monoamines such as cyclohexylamine, dicyclohexylamine, etc.; aromatic monoamines such as aniline, toluidine, diphenylamine, naphthylamine, etc.; arbitrary mixtures of these. Among these, from the viewpoint of reactivity, boiling point, stability of capped terminal, cost, etc., butylamine, hexylamine, octylamine, decylamine, stearylamine, cyclohexylamine and aniline are preferred.

In the case where prepolymer formation is followed by solid-phase polymerization, the process is preferably carried out in an inert gas atmosphere or under inert gas circulation. In the solid-phase polymerization, preferably, the polymerization temperature is 200° C. or higher and is lower by 20° C. than the melting point of the polyamide resin, and the polymerization time is 1 to 12 hours, and under the condition, the polymerization rate may be high and the productivity is excellent, and the polyamide resin can be effectively prevented from coloration or gelation.

On the other hand, in the case where the prepolymer formed is polymerized using a melt extruder, it is preferable that the polymerization temperature is 370° C. or lower and the polymerization time is 5 to 60 minutes. In polymerization under the condition, the polyamide decomposes little, and the polyamide resin (A) can be obtained with no degradation thereof.

[Polyalcohol (B)]

In the polyamide resin composition of the present invention, from the viewpoint of improving the long-term heat resistance and the long-term acid resistance thereof, a polyalcohol (B) is blended. The polyalcohol is a dihydric or more polyhydric alcohol having 2 or more hydroxyl groups in the molecule. It is considered that, reacting with the terminal functional group that the polyamide resin (A) has, the polyalcohol (B) could exhibit an effect of improving the long-term heat resistance of the polyamide resin composition at higher than 200° C. and an effect of improving the long-term acid resistance thereof. In particular, by combining the above-mentioned polyamide resin (A) and the polyalcohol (B), it is possible to obtain a polyamide resin composition and a molded article thereof whose mechanical strength lowers little even though they are exposed to a high-temperature environment for a long time and then further exposed to a strong-acid environment for a long period of time, such as engine peripheral parts of automobiles equipped with a supercharger and EGR, etc.

From the viewpoint of reacting with the terminal functional group in the polyamide resin (A) to form a crosslinked structure thereby improving the long-term heat resistance and the long-term acid resistance of the polyamide resin composition, the polyalcohol is preferably a tri-hydric or more poly-hydric one, and is more preferably a tetra-hydric or more poly-hydric one.

Examples of the tri-hydric or more poly-hydric alcohol (B) include triols such as glycerin, trimethylolethane, trimethylolpropane, trimethylolbutane, 2-hydroxymethyl-1,4-butanediol, etc.; tetraols such as pentaerythritol, ditrimethylolpropane, etc.; hexaols such as dipentaerythritol, etc. One alone or two or more of these polyalcohols may be used either singly or as combined.

Among these, from the viewpoint of improving the long-term heat resistance and the long-term acid resistance of the polyamide resin composition, dipentaerythritol is more preferred.

The blending amount of the polyalcohol (B) in the polyamide resin composition 1 to 10 parts by mass relative to 100 parts by mass of the polyamide resin (A), preferably 2 to 8 parts by mass, more preferably 3 to 7 parts by mass. When the blending amount of the polyalcohol (B) is less than 1 part by mass relative to 100 parts by mass of the polyamide resin (A), the effect of improving the long-term heat resistance and the long-term acid resistance could not be sufficiently exhibited, and when more than 10 parts by mass, the mechanical strength of the polyamide resin composition would be worsened.

[Filler (C)]

Preferably, a filler (C) is further blended in the polyamide resin composition of the present invention, from the viewpoint of improving the stiffness and the mechanical strength of the polyamide resin composition to be obtained.

As the filler (C), an inorganic or organic filler that is generally added for various purposes of polymer weight increase and reinforcement and of improving mechanical properties may be used. In the polyamide resin composition of the present invention, above all, a fibrous filler is preferably used. The fibrous filler is not specifically limited, and includes glass fibers, carbon fibers, calcium silicate fibers, potassium titanate fibers, aluminum borate fibers, aramid fibers, etc. One alone or two or more kinds of these may be used either singly or as combined.

Among the above-mentioned fibrous fillers, glass fibers and carbon fibers are preferred from the viewpoint of improving the stiffness and the mechanical strength of the polyamide resin composition to be obtained, and in addition thereto, improving the long-term heat resistance and the long-term acid resistance thereof, glass fibers are more preferred.

The cross-sectional profile of the fibrous filler that is preferred as the filler (C) is not specifically limited, and may be square or true circular, or may also be flattened. Examples having a flattened cross-sectional profile include a rectangular form, an oval form close to a rectangular form, an ellipsoidal form, a cocoon form, a cocoon form where the center part in the lengthwise direction is narrowed, etc.

The mean fiber diameter of the fibrous filler that is preferred as the filler (C) is not specifically limited, but is, in general, preferably 0.5 to 250 μm, more preferably 3 to 100 μm. When the mean fiber diameter is 0.5 μm or more, spinning the fibers is easy, and when 250 μm or less, reduction in the mechanical strength of the molded article owing to reduction in the contact area with resin may be prevented.

The mean fiber length of the fibrous filler that is preferred as the filler (C) is, from the viewpoint of the stiffness and the mechanical strength of the polyamide resin composition to be obtained, generally preferably 0.5 to 10 mm, more preferably 1 to 5 mm. The mean fiber diameter and the mean fiber length of the fibrous filler may be observed and measured with an optical microscope.

The fibrous filler that is preferred as the filler (C) may be optionally surface-treated with a silane coupling agent, a titanate coupling agent or the like. Examples of the silane coupling agent include, though not limited thereto, aminesilanes such as γ-aminopropyltriethoxysilane, γ-aminopropyltrimethoxysilane, N-β-(aminoethyl)-γ-aminopropylmethyldimethoxysilane, etc.; mercaptosilanes such as γ-mercaptopropyltrimethoxysilane, γ-mercaptopropyltriethoxysilane, etc.; epoxysilanes, as well as vinylsilanes, etc. Above all, aminosilanes are more preferred.

Further, the fibrous filler may be optionally treated with a sizing agent. The sizing agent may include a copolymer containing an unsaturated vinyl monomer as the structural unit, an epoxy compound, a polyurethane resin, an acrylic acid homopolymer, a copolymer of acrylic acid with any other copolymerizable monomer, and a salt thereof with a primary, secondary or tertiary amine, etc. One alone or two or more of these may be used either singly or as combined.

In particular, from the viewpoint of the mechanical strength of the polyamide resin composition, the sizing agent is preferably a copolymer containing an unsaturated vinyl monomer as the structural unit, a polyurethane resin, or a combination thereof.

Examples of the unsaturated vinyl monomer include, though not limited thereto, a carboxylic anhydride-containing unsaturated vinyl monomer such as maleic anhydride, itaconic anhydride, citraconic anhydride, etc.; styrene, α-methylstyrene, ethylene, propylene, butadiene, isoprene, chloroprene, 2,3-dichlorobutadiene, 1,3-pentadiene, cyclooctadiene, methyl methacrylate, methyl acrylate, ethyl acrylate, ethyl methacrylate, etc. Among these, maleic anhydride, styrene and butadiene are preferred.

Among copolymers containing the above-mentioned unsaturated vinyl monomer as the structural unit, at least one selected from a group consisting of a copolymer of maleic anhydride and styrene, a copolymer of maleic anhydride and ethylene, a copolymer of maleic anhydride and butadiene, and a mixture of these is more preferred.

The polyurethane resin may be any one that may be used generally as a sizing agent, and examples thereof include, though not limited thereto, those to be synthesized form an isocyanate such as m-xylylene diisocyanate (XDI), 4,4'-methylenebis(cyclohexyl isocyanate) (HMDI), isophorone diisocyanate (IPDI) or the like and a polyester diol or a polyether diol.

The fibrous filler may be produced in a known fiber production process of continuous reaction where, according to a known method using a roller-type applicator, the above-mentioned sizing agent is applied to fibers and the resultant fiber strands are dried. The fiber strands may be directly used as roving, or may be chopped in a chopping step to give chopped glass strands for use as a filler. The strands may be dried after the chopping step or may also be dried before the chopping step. The amount of the sizing agent to be added is, as a solid content relative to 100 parts by mass of the fibrous filler, preferably 0.2 to 3 parts by mass, more preferably 0.3 to 2 parts by mass. When the amount of the sizing agent added is 0.2 parts by mass or more as the solid content relative to 100 parts by mass of the fibrous filler, sizing the fibers is easy to maintain. On the other hand, when the amount of the sizing agent added is 3 parts by mass or less relative to 100 parts by mass of the fibrous filler, the thermal stability of the polyamide resin to be obtained improves.

The blending amount of the filler (C) in the polyamide resin composition is preferably 10 parts by mass or more relative to 100 parts by mass of the polyamide resin (A), more preferably 20 parts by mass or more, even more preferably 30 parts by mass or more, and is preferably 200 parts by mass or less, more preferably 150 parts by mass or less, even more preferably 120 parts by mass or less. When the blending amount is 10 parts by mass or more, the stiffness and the mechanical strength of the polyamide resin composition to be obtained improve. When the blending amount is 200 parts by mass or less, the polyamide resin composition can be readily filled in a mold when molded in a mold.

The polyamide resin composition may optionally contain any other component, for example, any other thermoplastic resin than the polyamide resin (A), a compatibilizer, a crystal nucleating agent, a copper-based thermal stabilizer, an antioxidant (hindered phenol-type antioxidant, hindered amine-type antioxidant, thio-type antioxidant), a dye, a pigment, a UV absorbent, a light stabilizer, an antistatic agent, a lubricant, a plasticizer, a lubricant, a processing promoter, etc.

[Production Method for Polyamide Resin Composition]

The production method for the polyamide resin composition of the present invention is not specifically limited, but one example thereof is a method of blending the polyamide resin (A) and the polyalcohol (B) optionally along with the filler (C), and melt-kneading them.

The blending method with the polyalcohol (B) may be any method where it can be uniformly mixed with the polyamide resin (A), and in general, a method of melt-kneading them using a single screw extruder, a twin screw extruder, a kneader, a Banbury mixer or the like is employable. The melt-kneading condition is not specifically limited, and fore example, the two may be melt-kneaded for 1 to 30 minutes at a temperature higher by 30 to 50° C. than the melting point of the polyamide resin (A).

The filler (C) and the other components may be blended at the same time when the polyalcohol (B) is blended, or the polyamide resin (A) and the polyalcohol (B) are first mixed and then the former components may be blended and melt-kneaded with them. The melt-kneading method may be the same as the above-mentioned method.

In the case where the filler (C) is blended in the polyamide resin composition, it is preferable that the other components than the component (C) are previously mixed and then the component (C) is blended and further melt-kneaded with them. In this case, the melt-kneading temperature is preferably a temperature higher by 5° C. than the melting point of the polyamide resin (A) to a temperature higher by 375° C. or so, and the melt-kneading time is preferably 0.5 to 15 minutes or so.

<Molded Article>

The molded article of the present invention is one obtained by molding the above-mentioned polyamide resin composition of the present invention. For example, depending on the intended type, use and shape of the molded article to be obtained, the polyamide resin composition of the present invention is molded according to an ordinary molding method of injection molding, gas-assisted injection molding, injection deposition molding, extrusion molding, press molding, blow molding, calender molding, casting or the like generally used for thermoplastic polymer compositions, thereby producing various molded articles. A molding method of a combination of the above-mentioned molding methods may also be employed. Further, the polyamide resin composition of the present invention may be combined with other various materials such as various thermoplastic resins, thermosetting resins, papers, metals, woods, ceramics or the like by bonding, welding or joining them, to produce composite molded articles.

The molded article of the present invention has excellent long-term heat resistance and long-term acid resistance and are therefore favorable as automobile parts, especially engine peripheral parts of automobiles equipped with a supercharger and EGR.

Examples of automobile engine peripheral parts include cooling parts such as thermostat housings, radiator tanks, radiator hoses, water outlets, water pump housings, rear joints, etc.; breather parts such as intercooler tanks, intercooler cases, turbo duct pipes, EGR cooler cases, resonators, throttle bodies, intake manifolds, tail pipes, etc.; fuel system parts such as fuel delivery pipe, gasoline tanks, quick connectors, canisters, pump modules, fuel pipes, oil strainers, locknuts, sealants, etc.

In addition, the polyamide resin composition of the present invention is excellent in mechanical strength and thermal characteristics, and is therefore effectively used for production of various types of molded articles such as other automobile parts than engine peripheral parts, electric parts, electronic parts, industrial parts, fibers, films, sheets and other various types of molded articles having any other shape and use.

Examples of the other automobile parts than engine peripheral parts include structural parts such as mount brackets, torque rods, cylinder head covers, etc.; driving system parts such as hearing retainers, gear tensioners, head lamp actuator gears, slide door rollers, clutch, peripheral parts, etc.; brake system parts such as air brake tubes, etc.; in-car electric components such as wire harness connectors in engine rooms, motor parts, sensors, ABS bobbins, combination switches, in-car switches, etc.; interior and exterior parts such as slide door dampers, door mirror stays, door mirror brackets, inner mirror stays, roof rails, engine mount brackets, air cleaner inlay pipes, door checkers, plastic chains, emblems, clips, breaker covers, cup holders, air bags, fenders, spoilers, radiator supports, radiator grills, louvers, air scoops, hood bulges, back doors, fuel sender modules, etc.

Examples of electric parts or electronic parts include surface-mount technology (SMT) connectors such as flexible printed circuit (FPC) connectors, board-to-board (B to B) connectors, card connectors, etc.; SMT switches, SMT relays, SMT bobbins, memory card connectors, CPU sockets, LED reflectors, cable wire coatings, optical fiber parts, sound-absorbing gears of AV equipments and OA equipments, flasher parts, cell-phone parts, heat-resistant gears for copiers, end caps, commutators, industrial plugs, command switches, noise filters, magnet switches, solar cell substrates, liquid crystal boards, LED mounted boards, flexible printed circuit boards, flexible flat cables, etc.

Examples of industrial parts include gas pipes, oil pipes, hoses, ant-proof cables (communication cables, pass cables, etc.), coating parts of powder-coated articles (inner coatings of water pipes), offshore oilfield pipes, pressure-resistant hoses, hydraulic tubes, paint tubes, fuel pumps, separators, supercharger ducts, butterfly valves, conveyor roller bearings, railroad tie spring bearings, outboard engine covers, power generator engine covers, irrigation valves, large-scale switches, monofilaments (extruded yarns) offish nets, etc.

Examples of fibers include air bag ground fabrics, heat-resistant fillers, reinforcing fibers, brush bristles, fishlines, tire cords, artificial lawns, carpets, fibers for seats, etc.

Examples of films and sheets include heat-resistant adhesive tapes such as heat-resistant masking tapes, industrial tapes, etc.; magnetic tape materials for cassette tapes, digital data storage magnetic tapes, video tapes, etc.; food packaging materials such as retort food pouches, individual packages for cookies, wrappings for processed meat products, etc.; electronic part packaging materials for semiconductor packages, etc.

In addition, the polyamide resin composition of the present invention can be favorably used for production of various molded articles such as plastic magnets, shoe soles, tennis rackets, ski boards, bond magnets, spectacle frames, banding bands, tag pins, sash crescents, electric tool motor fans, motor stator insulation blocks, lawn mower engine covers, lawn mower fuel tanks, ultra-small slide switches, dual in-line package (DIP) switches, switch housings, lamp sockets, connector shells, IC sockets, bobbin covers, relay boxes, capacitor cases, small-size motor cases, gear, cams, dancing pulleys, spacers, insulators, fasteners, casters, wiper clips, bicycle wheels, terminal, stands, starter insulation parts, fuse boxes, air cleaner cases, air conditioner fans, terminal housings, wheel covers, bearing retainers, water pipe impellers, clutch release bearing hubs, heat-resistant container, microwave oven parts, rice cooker parts, printer ribbon guides, etc.

EXAMPLES

The present invention is described in detail with reference to the following Examples and Comparative Examples (hereinafter these may be referred to as Examples and others), but the present invention is not limited to these. In the following Examples and others, the melting point, the long-term heat resistance and the long-term acid resistance were measured and evaluated according to the methods mentioned below.

[Melting Point]

The melting point of the polyamide resin used in Examples and others is a melting peak temperature (° C.) thereof appearing in heating the resin from 30° C. to 360° C. at a rate of 10° C./min in a nitrogen atmosphere, using a differential scanning calorimeter "DSC 822" manufactured by Mettler-Toledo International Inc. In the case where the resin had plural melting peaks, the melting peak temperature on the highest temperature side was referred to as the melting point thereof.

[Evaluation of Long-Term Heat Resistance]

The polyamide resin composition obtained in Examples and others was injection-molded (mold temperature: 120° C.) at a cylinder temperature higher by about 20° C. than the melting point of the resin composition to prepare ISO multipurpose test pieces type-A (length 80 mm, width 10 mm, thickness 4 mm). The test piece was tested in a tensile test at 23° C. according to ISO527-2/1A, and the tensile strength thereof was calculated according to the following equation (1). The value is referred to as an initial tensile strength (a).

$$\text{Tensile Strength (MPa)} = \text{stress at break } (N)/\text{cross section area of test piece } (mm^2) \quad (1)$$

Some of the test pieces were statically left in a constant-temperature oven ("DE-303" manufactured by Mita Industry Corporation) set at 210° C.±5° C. for 1,000 hours. After 1,000 hours, the test pieces were taken out of the oven and subjected to a tensile test according to the same method as described above, and the tensile strength (b) of the test pieces after heating was measured. According to the following equation (2), the retention of tensile strength was obtained, and the long-term heat resistance of the resin composition was thus evaluated.

$$\text{Retention of Tensile Strength (\%)} = \{b/a\} \times 100 \quad (2)$$

[Long-Term Acid Resistance Evaluation 1 (Long-Term Acid Evaluation after Long-Term Heat-Resistance Test)]

Some of the test pieces heated for 1,000 hours according to the above-mentioned method were immersed in an aqueous sulfuric acid solution controlled to have a pH of 1.0 and sealed up therein, and statically left in a constant-temperature oven at 100° C.±5° C. for 500 hours. After 500 hours, the test pieces were taken out of the aqueous sulfuric acid solution, and subjected to a tensile test according to the same method as described above, and the tensile strength (c) of the test pieces after the acid resistance test was measured. The retention of tensile strength was determined according to the following equation (3), and the long-term acid resistance of the resin composition after the long-term heat resistance test was evaluated.

$$\text{Retention of Tensile strength (\%)} = \{c/a\} \times 100 \quad (3)$$

[Long-Term Acid Resistance Evaluation 2]

The polyamide resin composition obtained in Examples and others was formed into ISO multipurpose test pieces type-A (length 80 mm, width 10 mm, thickness 4 mm) according to the same method as mentioned above, and the initial tensile strength (a) thereof was measured.

Some of the test pieces were immersed in an aqueous sulfuric acid solution controlled to have a pH of 1.0 and sealed up therein, and statically left in a constant-temperature oven at 100° C.±5° C. for 500 hours. After 500 hours, the test pieces were taken out of the aqueous sulfuric acid solution, and subjected to a tensile test according to the same method as described above, and the tensile strength (d) of the test pieces after the acid resistance test was measured. The retention of tensile strength was determined according to the following equation (4), and the long-term acid resistance of the resin composition was evaluated.

$$\text{Retention of Tensile Strength (\%)} = \{d/a\} \times 100 \quad (4)$$

Production Example 1

Production of Polyamide Resin PA1

5111.2 g (29.7 mol) of terephthalic acid, 4117.6 g (26.0 mol) of 1,9-nonamethylenediamine, 728.6 g (4.59 mol) of 2-methyl-1,8-octamethylenediamine, 110.4 g (1.84 mol) of acetic acid as a terminal capping agent, 10 g of sodium hypophosphite monohydrate as a catalyst, and 2.5 L of distilled water were put in an autoclave having an internal volume of 40 L, and purged with nitrogen. The internal temperature was elevated up to 200° C. taking 2 hours. At the time, the autoclave was pressurized up to 2 MPa. Subsequently, these were reacted for 2 hours while water vapor was gradually removed and the pressure was kept at 2 MPa. Next, the pressure was lowered down to 1.2 MPa taking 30 minutes to produce a prepolymer. The prepolymer was ground, and dried at 120° C. under reduced pressure for 12 hours. This was polymerized in a mode of solid-phase polymerization under a pressure of 13.3 Pa and at a temperature of 230° C. for 10 hours to give a polyamide resin PA1 having a melting point of 289° C. and an amide group concentration of 0.118.

Production Example 2

Production of Polyamide Resin PA2

3478.1 g (23.8 mol) of adipic acid, 986.81 g (5.94 mol) of terephthalic acid, 3554.6 g (30.6 mol) of hexamethylenediamine, 110.4 g (1.84 mol) of acetic acid as a terminal capping agent, 10 g of sodium hypophosphite monohydrate as a catalyst, and 2.5 L of distilled water were put in an autoclave having an internal volume of 40 L, and purged with nitrogen. The internal temperature was elevated up to 220° C. taking 2 hours. At the time, the autoclave was pressurized up to 2 MPa. Subsequently, these were reacted for 2 hours while water vapor was gradually removed and the pressure was kept at 2 MPa. Next, the pressure was lowered down to 1.2 MPa taking 30 minutes to produce a prepolymer. The prepolymer was ground, and dried at 120° C. under reduced pressure for 12 hours. This was polymerized in a mode of solid-phase polymerization under a pressure of 13.3 Pa and at a temperature of 230° C. for 10 hours to give a polyamide resin PA2 having a melting point of 263° C. and an amide group concentration of 0.166.

Production Example 3

Production of Polyamide Resin PA3

1955.8 g (13.4 mol) of adipic acid, 2717.4 g (16.4 mol) of terephthalic acid, 3554.6 g (30.6 mol) of hexamethylenediamine, 110.4 g (1.84 mol) of acetic acid as a terminal capping agent, 10 g of sodium hypophosphite monohydrate as a catalyst, and 2.5 L of distilled water were put in an autoclave having an internal volume of 40 L, and purged with nitrogen. The internal temperature was elevated up to 220° C. taking 2 hours. At the time, the autoclave was pressurized up to 2 MPa. Subsequently, these were reacted for 2 hours while water vapor was gradually removed and the pressure was kept at 2 MPa. Next, the pressure was lowered down to 1.2 MPa taking 30 minutes to produce a prepolymer. The prepolymer was ground, and dried at 120° C. under reduced pressure for 12 hours. This was polymerized in a mode of solid-phase polymerization under a pressure of 13.3 Pa and at a temperature of 230° C. for 10 hours to give a polyamide resin PA3 having a melting point of 300° C. and an amide group concentration of 0.142.

The polyamide resin, the polyalcohol (B) and the filler (C) used in Examples and others are shown below.

[Polyamide Resin]
PA1: Polyamide resin obtained in Production Example 1 (amide group concentration 0.118)
PA2: Polyamide resin obtained in Production Example 2 (amide group concentration 0.166)
PA3: Polyamide resin obtained in Production Example 3 (amide group concentration 0.142)

[Polyalcohol (B)]
Dipentaerythritol ("Di-Pentarit" manufactured by Koei Chemical Company, limited)

[Filler (C)]
Glass fibers ("CS03JA-FT2A" manufactured by Owens Corning Japan Ltd., cross-sectional profile: circular, mean fiber diameter: 10.5 μm, mean fiber length: 3 mm, surface-treatment agent: aminosilane coupling agent, sizing agent: carboxylic anhydride-containing unsaturated vinyl monomer)

Examples 1 and 2 and Comparative Examples 1 to 3

The polyamide resin shown in Table 1 was dried at 120° C. under reduced pressure for 24 hours, and then blended in dry with the polyalcohol (B) in the amount shown in Table 1 and with a crystal nucleating agent, a phenolic antioxidant, a dye and a lubricant. The resultant mixture was fed into a twin-screw extruder (screw diameter: 30 mm, L/D=28, cylinder temperature 30° C., rotation number 150 rpm) via the hopper thereof, and the filler (C) in the amount shown in Table 1 was fed thereinto via the lower-side hopper, and these were melt-kneaded and extruded out as strands, which were then pelletized with a pelletizer to give a polyamide resin composition in the form of pellets. The resultant polyamide resin composition was formed into test pieces having the predetermined shape according to the above-mentioned method, and the physical properties thereof were evaluated. The results are shown in Table 1.

Comparative Example 4

A polyamide resin composition was obtained according to the same method as above, except that the type and the amount of the polyamide resin, as well as the amount of the polyalcohol (B) and the filler (C) were changed as in Table 1 and that the cylinder temperature was changed to 350° C. The resultant polyamide resin composition was formed into test pieces having the predetermined shape according to the above-mentioned method, and the physical properties thereof were evaluated. The results are shown in Table 1.

TABLE 1

| | | | Unit | Example 1 | Example 2 | Comparative Example 1 | Comparative Example 2 | Comparative Example 3 | Comparative Example 4 |
|---|---|---|---|---|---|---|---|---|---|
| Polyamide Resin Composition | Polyamide Resin (A) | PA1 (amide group concentration: 0.118) | part by mass | 70 | 50 | 70 | 50 | | |
| | Other Polyamide Resins | PA2 (amide group concentration: 0.166) | part by mass | | | | | 60 | |
| | | PA3 (amide group concentration: 0.142) | part by mass | | | | | | 65 |

TABLE 1-continued

|  |  | Unit | Example 1 | Example 2 | Comparative Example 1 | Comparative Example 2 | Comparative Example 3 | Comparative Example 4 |
|---|---|---|---|---|---|---|---|---|
|  | Polyalcohol (B) | dipentaerythritol | part by mass | 3.5 | 2.5 | 0 | 0 | 3.0 | 3.0 |
|  | Filler (C) | glass fibers | part by mass | 30 | 50 | 30 | 50 | 40 | 35 |
|  | Content of Component (B) relative to 100 parts by mass of polyamide resin |  | part by mass | 5.0 | 5.0 | 0.0 | 0.0 | 5.0 | 4.6 |
| Evaluation Results | Long-Term Heat Resistance Evaluation | Retention of tensile strength after heated at 210° C. for 1,000 hours | % | 85 | 86 | 41 | 37 | 109 | 96 |
|  | Long-Term Acid Resistance Evaluation 1 | Retention of tensile strength after heated at 210° C. for 1,000 hours and immersed in aqueous sulfuric acid solution at pH 1.0 and at 100° C. for 500 hours | % | 66 | 69 | 30 | 29 | 15 | 43 |
|  | Long-Term Acid Resistance Evaluation 2 | Retention of tensile strength after immersed in aqueous sulfuric acid solution at pH 1.0 and at 100° C. for 500 hours | % | 82 | — | 69 | — | — | — |

The required term for retention of heat resistance and acid resistance could not be always definitely defined but in consideration of ordinary use environments and usable years in mobile application, the time employed in evaluation in Examples can be used as one criterion.

In the polyamide resin compositions of Examples 1 and 2, the amide group concentration of the polyamide resin (A) falls within a specific range and the compositions contains dipentaerythritol as a polyalcohol (B) in a predetermined amount, and therefore, the resin compositions are excellent in long-term heat resistance at 210° C. and in long-term acid resistance in an aqueous sulfuric acid solution at pH 1.0. The polyamide resin compositions of Comparative Examples 1 and 2 contain the same polyamide resin (A) having the same amide group concentration as in Examples 1 and 2 but do not contain the polyalcohol (B), and are therefore extremely inferior to those of Examples 1 and 2 in point of the long-term heat resistance. The polyamide resin compositions of Comparative Examples 3 and 4 contain the polyalcohol (B), but in these, the amide group concentration in the polyamide resin (A) is outside the scope in the present invention, and accordingly, the resin compositions are extremely inferior to those of Examples 1 and 2 in point of the long-term acid resistance after the long-term heat resistance test.

INDUSTRIAL APPLICABILITY

The polyamide resin composition of the present invention is excellent in long-term heat resistance and long-term acid resistance, and can be therefore widely used in production of various molded articles of, for example, engine peripheral parts of automobiles equipped with a supercharger and EGR and, in addition thereto, other automobile parts than engine peripheral parts, as well as electric parts, electronic parts, industrial parts, etc.

The invention claimed is:
1. A polyamide resin composition, comprising:
a polyamide resin (A);
a polyalcohol (B); and
a filler (C);
wherein an amount of the polyalcohol (B) is from 1 to 10 parts by mass per 100 parts by mass of the polyamide resin (A),
wherein a proportion of the number of the amide groups to the number of the carbon atoms in the polyamide resin (A) is from 0.080 to 0.140,
the polyamide resin (A) consists of:
a structural unit derived from a diamine component (i) comprising 1,9-nonamethylenediamine and 2-methyl-1,8-octamethylenediamine, and a molar ratio of the structural unit derived from 1,9-nonamethylenediamine to the structural unit derived from 2-methyl-1,8-octamethylenediamine is from 99:1 to 1:99,
a structural unit derived from a dicarboxylic acid component (ii) selected from terephthalic acid and 1,4-cyclohexanedicarboxylic acid, and
a monocarboxylic acid selected from the group consisting of acetic acid, propionic acid, butyric acid, valeric acid, caproic acid and benzoic acid,
wherein the filler (C) is a fibrous filler, and the fibrous filler is treated with a sizing agent which comprises at least one selected from a group consisting of a copolymer of maleic anhydride and styrene, a copolymer of maleic anhydride and ethylene, a copolymer of maleic anhydride and butadiene, and a mixture thereof, and
wherein am amount of the sizing agent is, as a solid content relative to 100 parts by mass of the fibrous filler, is from 0.2 to 3 parts by mass.
2. The polyamide resin composition according to claim 1, wherein the polyalcohol (B) is dipentaerythritol.
3. The polyamide resin composition according to claim 1, wherein the molar ratio of the structural unit derived from 1,9-nonamethylenediamine to the structural unit derived from 2-methyl-1,8-octamethylenediamine is from 95:5 to 50:50.
4. The polyamide resin composition according to claim 1, wherein the molar ratio of the structural unit derived from 1,9-nonamethylenediamine to the structural unit derived from 2-methyl-1,8-octamethylenediamine is from 90:10 to 75:25.
5. The polyamide resin composition according to claim 1, wherein a content of the structural unit derived from the diamine component (i) in the polyamide resin (A) is 80 to

100 mol % relative to a total of structural units derived from an diamine component in the polyamide resin (A).

6. The polyamide resin composition according to claim 1, wherein a content of the structural unit derived from the diamine component (i) in the polyamide resin (A) is 90 to 100 mol % relative to a total of structural units derived from an diamine component in the polyamide resin (A).

7. The polyamide resin composition according to claim 1, wherein a polymer component of the polyamide resin composition does not comprise a thermoplastic resin other than the polyamide resin (A).

8. A molded article, obtained by a process comprising molding the polyamide resin composition according to claim 1.

9. The molded article according to claim 8, wherein the molded article is an automobile part.

* * * * *